(12) United States Patent
Schwendener et al.

(10) Patent No.: US 10,830,588 B2
(45) Date of Patent: Nov. 10, 2020

(54) SURVEYING INSTRUMENT FOR SCANNING AN OBJECT AND IMAGE ACQUISTION OF THE OBJECT

(71) Applicant: HEXAGON TECHNOLOGY CENTER GMBH, Heerbrugg (CH)

(72) Inventors: Andreas Schwendener, Chur (CH); Bernd Walser, Heerbrugg (CH); Marco Schröder, Neukirch (CH); Benjamin Seifert, Grabs (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 258 days.

(21) Appl. No.: 16/026,987

(22) Filed: Jul. 3, 2018

(65) Prior Publication Data
US 2019/0011257 A1 Jan. 10, 2019

(30) Foreign Application Priority Data
Jul. 4, 2017 (EP) ..................................... 17179590

(51) Int. Cl.
*G01C 15/00* (2006.01)
*G01C 11/02* (2006.01)
*H04N 5/232* (2006.01)

(52) U.S. Cl.
CPC ............ *G01C 15/002* (2013.01); *G01C 11/02* (2013.01); *H04N 5/23293* (2013.01)

(58) Field of Classification Search
CPC .................................................. G01C 15/002
(Continued)

(56) References Cited

U.S. PATENT DOCUMENTS 8,218,131 B2 * 7/2012 Otani .................... G01C 15/002
356/4.01
9,658,059 B2 * 5/2017 Metzler ................ G01C 15/002
(Continued)

FOREIGN PATENT DOCUMENTS

CN 101932952 A 12/2010
CN 105807284 A 7/2016
(Continued)

OTHER PUBLICATIONS

European Search Report dated Jan. 3, 2018 as received in Application No. 17179590.

*Primary Examiner* — Christopher W Fulton
(74) *Attorney, Agent, or Firm* — Maschoff Brennan

(57) ABSTRACT

A surveying device including a base defining a base axis (A), a support structure defining a rotation axis (B), a light emitting unit, a light receiving unit detecting reflected measuring light, and a rotation unit including a rotation body including at least one scanning mirror arranged tilted relative to the rotation axis (B) and a curved deflecting element different from the scanning surface. The surveying device also includes an imaging unit including a camera sensor which is fixedly arranged so that an optical axis of the camera sensor is directed towards the rotation body, such that only in a predetermined imaging-alignment of the rotation body around the rotation axis (B) the optical axis of the at least one camera sensor is deflected by the curved deflecting element by a desired angle and direction so that the field of view comprises a defined field angle around the rotation axis (B).

14 Claims, 4 Drawing Sheets

(58) Field of Classification Search
 USPC .................................. 33/290; 356/4.01, 5.01
 See application file for complete search history.

(56) References Cited

U.S. PATENT DOCUMENTS

| | | | |
|---|---|---|---|
| 9,658,335 B2* | 5/2017 | Siercks | G01C 15/002 |
| 9,880,265 B2* | 1/2018 | Schneider | G01S 17/08 |
| 2005/0168720 A1* | 8/2005 | Yamashita | G01S 7/497 |
| | | | 356/4.01 |
| 2008/0074637 A1* | 3/2008 | Kumagai | G01C 15/002 |
| | | | 356/4.01 |
| 2011/0235018 A1* | 9/2011 | Mori | G01S 7/4817 |
| | | | 356/5.01 |
| 2012/0070077 A1 | 3/2012 | Ossig et al. | |
| 2014/0063489 A1 | 3/2014 | Steffey et al. | |
| 2015/0098075 A1* | 4/2015 | Bestler | G01C 15/002 |
| | | | 356/3.01 |
| 2016/0033643 A1* | 2/2016 | Zweigle | G01S 7/003 |
| | | | 356/5.01 |
| 2016/0061954 A1 | 3/2016 | Walsh et al. | |
| 2016/0084651 A1* | 3/2016 | Hinderling | G01S 7/4817 |
| | | | 356/4.01 |
| 2016/0146604 A1* | 5/2016 | Metzler | G01C 15/002 |
| | | | 33/228 |
| 2016/0274224 A1* | 9/2016 | Nordenfelt | G01S 7/4817 |

FOREIGN PATENT DOCUMENTS

| | | |
|---|---|---|
| DE | 20 2010 017899 U1 | 2/2013 |
| DE | 20 2013 001538 U1 | 3/2013 |
| JP | H08278461 A | 4/1998 |
| WO | 2009/095384 A2 | 8/2009 |

\* cited by examiner

SURVEYING INSTRUMENT FOR SCANNING AN OBJECT AND IMAGE ACQUISTION OF THE OBJECT

CROSS-REFERENCE TO RELATED APPLICATIONS

This application claims priority to European Patent Application No. 17179590.9 filed on Jul. 4, 2017. The foregoing patent application are incorporated herein by reference.

FIELD OF INVENTION

The present invention relates to a surveying device, to a rotation unit for a laser scanner, and a method for scanning an object using a surveying device.

BACKGROUND

Laser scanning is used to survey many different settings such as construction sites, building facades, industrial facilities, interior of houses, or any other applicable setting. The laser scans achieved therewith may be used to obtain accurate three-dimensional (3D) models of a setting, wherein the models consist of a point cloud. The points of such a cloud are stored by coordinates in a coordinate system, which may be defined by the laser scanning device that had recorded the point cloud. Usually, the laser scanner constitutes the origin of the coordinate system by a unit that sends out the scanning beams, in particular by the nodal point of the scanner. The points are surveyed by associating a distance measured with the scanning beam (for example, with a time-of-flight method) and the alignment under which the distance was measured. Usually, the coordinate system is a spherical coordinate system, so that a point can be characterized by a distance value, an elevation angle and an azimuth angle with reference to the origin of the coordinate system.

Common laser scanners comprise a unit for sending out a scanning beam and for receiving the reflected beam in order to measure the distance of a point the beam was directed at. Usually, these scanners furthermore comprise means to rotatably alter the direction of the beams, commonly a vertical rotation axis (scanning axis) and a horizontal rotation axis (base axis), of which one may be a slow axis and the other one may be a fast axis, wherein both axes can be sensed with angle sensors. The rotation of the vertical axis is associated with an azimuth angle and the rotation of the horizontal axis is associated with by an elevation angle.

The distances may be calculated with the travel time measurement (time-of-flight) method by observing the time between sending out and receiving a signal. Other possible method could be to measure the phase delay between sent and received signal. The alignment angles can be achieved with said angle sensors arranged at the vertical axis and at the horizontal axis. Other possible method could be to derive the angles from the known constant rotation speed of the axes, a point of reference, and the sampling rate of the distance measurements.

Another means to document the environment is to acquire a panorama or full-dome image of the settings. Such an image can provide a more intuitive visualization than a point cloud or a different visualization of the environment when the image sensors capture a different spectrum than the visible one, e.g. with thermal cameras. In general, such a panorama or full-dome image is used to digitally colourise the point cloud for a more ergonomic visualization. In various applications, terrestrial laser scanning is hence supported by imaging data of a camera which is combined with a laser scanner by including them in the laser scanner instrument or mounting them on the same platform as the laser scanner.

Such is known in prior art and for example described in US20140063489A1, US20160061954A1 and US20120070077A1.

However, prior art typically offers comparatively complicated solutions to solve parallax errors which occur due to different perspectives of a camera and a scanner. For example, according to US20140063489A1, the camera is incorporated inside the scanner and components are arranged such that the camera and the scanner have the same optical axis. However the entrance pupil location of the camera is not at the same location as the nodal point. Therefore only the central point of the camera has the same perspective as the scanner. Other points in the field of view (FOV) of the camera will have a parallax error. This construction requires a high technical effort.

According to US20120070077A1, a camera is a posteriori brought virtually into a position close to the position where the scanner had been to scan the environment. This process requires high processing effort with limited success. Artefacts will remain due to the relatively large parallax between entrance pupil of camera and nodal point of scanner.

If a camera on a laser scanner does not share a single projective centre with the scanner unit, then a parallax is introduced. As a consequence an incorrect reference of image data to scanning data may happen. The parallax effect takes place at regions where the camera "looks" under a significantly different angle than the scanner to a certain object point and therefore "sees" this point at a different 3D-position, than the scanner "sees" it. Additionally, there can be points, "seen" by the scanner, but not by the camera, which results in 3D-points without colour data. In order to avoid such incorrect reference of colourisation or missing of colour data due to the camera's parallax, an algorithm for identifying these particular regions can be implemented including the use of 3D data and for correcting colourisation. Such algorithmic approach, however, is comparatively time-consuming and resource (energy) consuming and still cannot fully correct colourisation, especially in the near field. Therefore artefacts will occur in the colorized 3D point cloud data.

BRIEF DESCRIPTION

It is therefore an object of some embodiments the present invention to provide an improved surveying instrument allowing for a provision of image acquisition with high precision, exact reference to gathered scanning data and in particular with no missing colour data.

Laser scanner can generate a point cloud of a scenery around 360° horizontally and close to 180° vertically based on laser-distance and angle encoder measurements. In general, missing is the colour information and the photographic picture like visualization of the scenery. Therefore the extension by a camera system is worthwhile for presenting the data and documentation. Critical condition in this kind of sensor fusion of the two measurement approaches is the parallax-free condition to avoid unwanted artefacts that cause distance values (voxels) with wrong colour information, that could make the final scan result appear unreliable Some embodiments of the present invention propose an approach of achieving a full-dome image at nearly parallax-free conditions in particular with a laser scanner device.

One major issue for stitched full dome images is the so called parallax. Parallax occurs for instance, when an entrance pupil centre of the lens is not coincident with the intersection of the vertical (base) and horizontal (rotation) axis of a laser scanner.

Parallax generally means that an object point is imaged under different viewing angles, caused by a position change of the entrance pupil centre. This happens e.g., when a camera is rotated not around its entrance pupil centre. The angle difference is commonly called the parallax angle.

"Parallax" also means the distance between the entrance pupil of the imaging lens and the intersection of the vertical and horizontal axis of the scanner. Such distance is to be minimised, ideally down to zero. If this distance is zero, the viewing angle on an object point does not change, when the camera is rotated, and therefore the parallax angle remains zero.

In imaging, the location of the entrance pupil centre can also determine the perspective centre that may also be called "nodal point". So when using the term "nodal point" in context of e.g. panorama photography, one should keep in mind, the "nodal point" should be located at the entrance pupil centre of the camera lens.

One consequence of an existing parallax is that there are regions, which are "seen" (measured) by the distance measuring unit of a laser scanner (EDM), but not by the imaging unit. Another parallax consequence is a lateral position error. This lateral error can typically be calibrated and by that compensated.

Ideally, the parallax of a panorama imaging system is zero. But due to lens-intrinsic pupil aberrations, tolerances and other setup-given effects, a real system may always have a residual parallax. But real systems also always have a non-ideal contrast function, i.e. they have a blur. So if the parallax-caused lateral error is smaller than this blur, the system can be considered as parallax-free regarding position error.

Generally, a real system never has zero parallax due to pupil aberration, tolerances etc. But from customers point of view a system is close to zero parallax, when it does not show visible parallax effects, in this way one can say the system behaves like a "quasi-parallax-free" setup. This is understood in the present invention as a parallax-free setup.

The present invention is based on the idea to provide a less complex and comparatively low cost solution of basically parallax-free image acquisition with a surveying instrument, e.g. a laser scanner. One main element of such solution is a particular design of the rotator of an instrument. Such rotation unit and its rotation body are equipped with one specific curved deflecting surface (in addition to a scanning mirror which is also provided with the rotation body). The curved deflecting element can preferably be provided by an element of hyperbolic shape (a hyperboloid of rotation) which defines two focal points. A camera device, which is assigned to the deflecting surface is arranged at a support structure of the scanner and thus is fixed relative to the rotation body.

By use of a curved deflecting element the field of view of an assigned camera sensor can be enlarged both in elevation and azimuth direction.

These two components—the rotation body and the camera—are arranged and designed so that the viewing axis and therefore the field of view of the camera is deflected and defined by the deflecting element in defined manner. By that image acquisition as if the entrance pupil of the camera coincides with the nodal point of the laser scanner can be provided.

The deflection can be provided in one particular alignment (orientation) of the rotation body around the fast scanning axis. This means, the rotation body is controlled to be orientated into such defined alignment and image acquisition can be performed by rotating or swivelling the support structure around the base axis while keeping the rotation angle for the rotation body constant. By that, a panoramic image or—depending on an elevation field angle of the resulting field of view—a full dome image can be acquired.

In other words and more general, the invention relates to a surveying device which in particular is embodied as a geodetic surveying device, in particular as a laser scanner.

The surveying device comprises a base which defines a base axis and a support structure which is arranged to be rotatable around the base axis and which defines a scanning axis which is oriented basically orthogonal relative to the base axis. Furthermore, a light emitting unit for emitting measuring light, in particular a laser diode, and a light receiving unit comprising a (photosensitive) detector for detecting reflected measuring light are provided.

The surveying device also comprises a rotation unit mounted on the support structure for providing emission and reception of measuring light in defined and variable (due to rotations) directions, wherein the rotation unit comprises a rotation body which is mounted rotatable around the scanning axis and the rotation body comprises at least one slanted scanning surface which comprises a scanning mirror which is arranged tilted relative to the scanning axis and provides defined deflection of the measuring light. The scanning mirror may be of parabolic shape. Such design allows acquiring distances and directions of a plurality of measuring points and by that to generate a point cloud which represents a respectively measuring region. The rotation unit may further comprise a driving unit (motor) for automated and controlled rotation of the rotation body. The rotation unit can further comprise a shaft by which the rotation body is connected to the motor and/or an angle encoder for determination of a rotational position.

An imaging unit for capturing an image of a scanning region and a controlling and processing unit are arranged as well.

According to some embodiments of the invention, the rotation body comprises a curved deflecting element different from the scanning surface. The imaging unit comprises at least one camera sensor which is fixedly arranged with the support structure so that an optical axis of the camera sensor is directed towards the rotation body. The imaging unit and the rotation body are designed so and arranged relative to each other so that only in a predetermined imaging-alignment of the rotation body around the rotation axis the optical axis of the at least one camera sensor is deflected by the curved deflecting element by a desired angle and direction and a field of view of the at least one camera sensor is deflected and defined by the deflection of the optical axis so that the field of view comprises a defined and enlarged field angle (compared to a field angle provided with the imaging unit) around the rotation axis (elevation), in particular in a plane at least basically orthogonal to or inclined in defined manner relative to the rotation axis.

A spread of the field of view of the camera sensor or the imaging unit, respectively, can be provided by use of the curved deflecting element. This allows gathering image information of a larger region with one particular alignment of the rotation element and one shot.

It is to be understood in context of the present invention that the field of view of the imaging unit may not only be extended with respect to an elevation angle but may also be extended with respect to an azimuth angle, i.e. around the base axis.

A comparatively large field angle in the plane at least basically orthogonal to the rotation axis of the rotation body would relate in particular to a significant smaller field angle in a plane parallel to the rotation axis of the surveying instrument. Hence, there may be provided a field of view with a larger elevation field angle and a smaller azimuth field angle.

Therefore, the surveying instrument according to some embodiments of the invention enables to bring and hold the rotation body in a well defined and known orientation, e.g. so that the rotation body provides a defined rotation angle around the rotation (scanning) axis, and by that enabling the camera sensor (imaging unit) to see at least part of the scanning region which can be measured by means of scanning with the measuring light. A particular arrangement of camera and deflecting surface and a particular design of the rotation body can also provide that respective images are captured as if the entrance pupil of the camera is located in or near the nodal point of the surveying instrument and thus results in parallax-free or quasi-parallax-free image capturing.

In particular, the camera sensor of the imaging can be provided as visual camera sensor or as infrared sensor.

Regarding the curved deflecting element, the surveying device comprises such curved deflecting element preferably having elliptical, parabolic or hyperbolic shape (shape of an ellipsoid, paraboloid or hyperboloid of rotation).

The curved deflecting element can be embodied as a hyperboloid having a reflective surface, in particular as a hyperbolic mirror.

In one embodiment of the invention, the curved deflecting element defines a first and a second geometric focal point and the curved deflecting element is arranged so that the first focal point positionally coincides with an intersection point of the base axis and the rotation axis, in particular with the nodal point of the surveying device. The second focal point positionally coincides with an entrance pupil for the at least one camera sensor (e.g. entrance pupil of the imaging unit) in the imaging-alignment the rotation body.

A hyperbolic mirror has two foci. This allows, realizing a wide-angle lens with zero parallax by placing a hyperbolic mirror with one focus at the intersection of the horizontal and vertical scanner axis (nodal point). The imaging lens (of the imaging unit) may then be placed with its entrance pupil at the other focus of the hyperbolic mirror. In addition, the negative refracting power of the hyperbolic mirror helps to achieve wide angle imaging.

FIG. 7 shows the principle of applied hyperbolic geometry and depicts a hyperbolic body 103 with two focal point 101,102 defined by the shape of the hyperbolic body 103.

In an embodiment the imaging unit comprises at least two camera sensors. The imaging unit and the sensors are fixedly arranged with the support structure so that the optical axes of the at least two camera sensors are directed towards the rotation body, in particular indirectly by deflections of the optical axes. There may be a mirror which deflects one or more optical axes.

In such embodiment, the imaging unit and the rotation body can be designed so and arranged relative to each other so that in the predetermined imaging-alignment of the rotation body around the rotation axis the optical axes of the at least two camera sensors are deflected by the curved deflecting element by respectively desired angles and directions and sub-fields of view of the at least two camera sensor are deflected and defined by the deflection of the optical axes so that one combined and continued wide-angle (elevation) field of view around the rotation axis, in particular with reference to the angle of rotation of the rotation body, in particular with reference to an elevation angle, is provided as a combination of the sub-fields of view.

The continued wide-angle (elevation) field of view preferably covers an angle of at least 100°, in particular at least 120° or at least 150°, around the rotation axis, in particular with respect to an elevation angle.

Correspondingly, the continued wide-angle azimuthal field of view can cover an angle of at least 25°, in particular at least 30°, around the base axis, in particular with respect to an azimuth angle.

Each of the sub-fields of view—which is defined by a deflection by means of the curved deflecting element in the predetermined imaging-alignment—can partly cover the wide-angle elevation field of view, wherein an overlap of adjacent elevation sub-fields of view may be provided.

Of course, image processing of the image data gathered by means of the three camera sensors can be provided in a manner so that there results one set of image data comprising data from all the three camera sensors. E.g. matching, blending and composition (e.g. stitching) of image data is performed according to approaches well known in the art. Based on such unified image data e.g. colouring of a scanning point cloud is provided in improved manner.

Referring to the design of the imaging unit, the imaging unit can comprise an optical assembly which images a field of view zone, which is provided by the curved deflecting element, to the at least one camera sensor, in particular images three sub-fields of view zones to respective three camera sensors. Therefore, the optical assembly enables to capture image data with the camera sensor in a manner adjusted to a particular design of the curved deflecting element, e.g. adjusted to a hyperbolic mirror. Possible deviations in deflection generated by the curved deflecting element can be compensated by that.

Thus, the optical assembly can provide compensated imaging of light which is deflected by the curved deflecting element on the at least one cameras sensor.

In particular, the optical assembly may provide compensation of a refractive effect and/or an asymmetric aberration resulting from a curved design of the curved deflecting element.

According to an embodiment of the invention, the optical assembly comprises a set of at least five (e.g. seven) successively arranged optical elements, in particular lenses or other refractive elements. The five optical elements represent a result of a calculation which is based on a design model which considers a design of the curved deflecting element. This allows adjusted imaging of light from the curved deflecting element onto at least one camera sensor.

In case of e.g. using three camera sensors, respective three deflection zones on side of the curved deflecting element are imaged on the three sensors, i.e. light impinging on one of the zones is guided to a respective camera sensor which is assigned to that zone.

Now referring to an embodiment wherein the curved deflecting element is built as a hyperbolic mirror. In comparison with a plane mirror a hyperbolic mirror has a refractive impact due to the curved surface like a lens element. Additionally the hyperbolic mirror may generate some specific asymmetric aberrations due to the asymmetry of the surface shape in the sub-aperture of each field point.

Therefore the optical assembly must be design including the hyperbolic surface into the design model.

An optical assembly adapted to the hyperbolic mirror may image three FOV zones to the three camera sensors. The three sensors FOVs can be combined with a beam splitter and mirror system.

In one embodiment every sensor has exactly the same imaging conditions and therefore the same performance.

Due to the non-planar surface shape of the hyperbolic mirror in the rotor, the refractive power is split between the mirror and the following lens elements of the optical assembly. Therefore, the alignment of the lens inside the laser scanner housing can refer to the mirror in a sensitive way. In the course of aligning the rotor and the imaging unit, full 6-DOF orientation between optical assembly and mirror needs to be considered, because otherwise decentration, tilt, defocus will be introduced, which may decrease the total performance. The position of the mirror may thus be sensitive for the performance like a lens element.

In particular, the entrance pupil or centres of projection of the imaging unit is positioned virtually in the nodal point of the system. In other words, the entrance pupil of all fields of view (defined by the camera sensors, the lens assembly and the respective deflecting surface) coincide with the intersection point of a horizontal and vertical axis of the surveying device (nodal point). By that, a parallax free full-dome image can be captured.

As a result the imaging setup acts as one particular camera which has virtually a single projective centre. This centre virtually coincides with the nodal point of the surveying device that may be embodied as a laser scanner. The field-of-view is somehow optimised in order to minimise acquisition time for a full-dome image.

In one embodiment the controlling and processing unit provides an imaging functionality which is configured so that the image data is recordable with each of the at least one camera sensors in case the rotation body is in the predetermined imaging-alignment. Additionally or alternatively, the controlling and processing unit is configured to control a step of rotating the rotation body around the rotation axis so that the rotation body is brought in the predetermined imaging-alignment. Acquisition of image data may be started after having reached the imaging-alignment.

The rotation body of the surveying device can be designed so that the scanning mirror is arranged on a front side of the rotation body and the curved deflecting element is arranged on the backside of the rotation body.

Furthermore, the rotation body may be arranged in a cylindrical cover which is designed to provide at least a first transmission window for emission and reception of the measuring light and a second transmission window for reception of light for capturing image data by the at least one camera sensor.

The predetermined imaging-alignment can be provided by one particular range of rotation around the rotation axis, or by one particular angle of rotation around the rotation axis.

In particular the imaging unit can be used for navigation (SLAM), e.g. when carrying the laser scanner from a first to a second scan position. By that, improved referencing of respective scanning positions and coordinate systems can be provided.

Some embodiments of the invention also relate to a rotation body of a rotation unit for a surveying device, in particular laser scanner. The rotation body is adapted to be mounted on the surveying device for providing defined emission and reception of measuring light by rotation around a rotation axis. The rotation axis is defined by a particular design, in particular by shape and dimension, of the rotation body, wherein the rotation body comprises at least one slanted scanning surface which comprises a scanning mirror which is arranged tilted relative to the rotation axis and provides defined deflection of the measuring (laser) light.

The rotation body comprises a curved deflecting element different from the scanning surface and the curved deflecting element provides—in its desired mounting on the surveying device—defined deflection of an optical axis of a camera sensor of the surveying device and an enlargement of its field of view.

In particular, the rotation body is designed according to any one of above specification relating to the rotation body of the described surveying device. Such particular design is to be understood as not being limited to specific design of the body itself but has to be understood as including e.g. realisations of the deflecting surfaces or the like In one embodiment, to decrease the complexity and the manufacturing cost of a parabolic (scanning) and a hyperbolic (imaging) mirror the body can be designed as a multi-body part. In this case it is possible to manufacture the paraboloid and hyperboloid separately and adjust those mirrors together in a second step.

The hyperbolic mirror can be automatically pre-adjusted to the parabolic mirror with two magnets. Afterwards movements in plane can be possible of e.g. approximately 0.5 mm. The imaging mirror can be fixed with adhesive as soon as it is adjusted to the optical axis.

A wall thickness in the middle of the parabolic mirror can be chosen to be quite small. If the rotor rotates with a spin speed of e.g. 6000 rpm, the mirror will be bent affecting the optical performance. Therefore, a pin screw at the top of the curved imaging mirror can function as a limit stop and may not be tightened.

To decrease an assembly tolerance and to increase the stiffness of the affected system a supporting frame (cover) may be advantageous.

Based on the morphology and the geometry of the hyperbole element and the large FOV the integration of a protection glass may be realised by using a quite thin bended window glass.

For increasing mechanical stability Gorilla Glass® or other strengthened glass can be used as an adequate cover. An alternative or additional solution might be a laminated thin sheet of glass.

Some embodiments of the invention also relate to a method of generating quasi full-dome image data of a scanning region by use of a surveying device according to above in controlled and automatic manner. Following steps are performed for the method:
   setting up the surveying device at a defined position,
   automatically (initiated and controlled by an algorithm) moving the rotation body into the predetermined imaging-alignment,
   automatically capturing a first set of image data by means of the at least one camera sensor,
   automatically re-orienting the support structure around the base axis by a defined angle according to a provided azimuth field of view of the at least one camera sensor, wherein the rotation body is held in the predetermined imaging-alignment,
   automatically capturing a further set of image data by means of the at least one camera sensor, and
   repeating the steps of re-orienting the support structure and of capturing a further set of image data until the scanning region is covered over an azimuth angle of 360°, in particular repeating the steps of re-orienting the support structure and of capturing a further set of image data for at least six, in particular eleven or twelve, times.

According to an embodiment, the rotation body is arranged in a cylindrical cover which is designed to provide at least a first transmission window for emission and reception of the measuring light and a second transmission window for reception of light for capturing images by the at least one camera. Such cover can help protecting the optical elements from environmental influences.

BRIEF SUMMARY OF THE DRAWINGS

The devices and method according to the invention are described or explained in more detail below, purely by way of example, with reference to working examples shown schematically in the drawings. Specifically, FIG. 1 show a first embodiment of a surveying device embodied as a laser scanner according to the invention.

DETAILED DESCRIPTION

Figure 1:
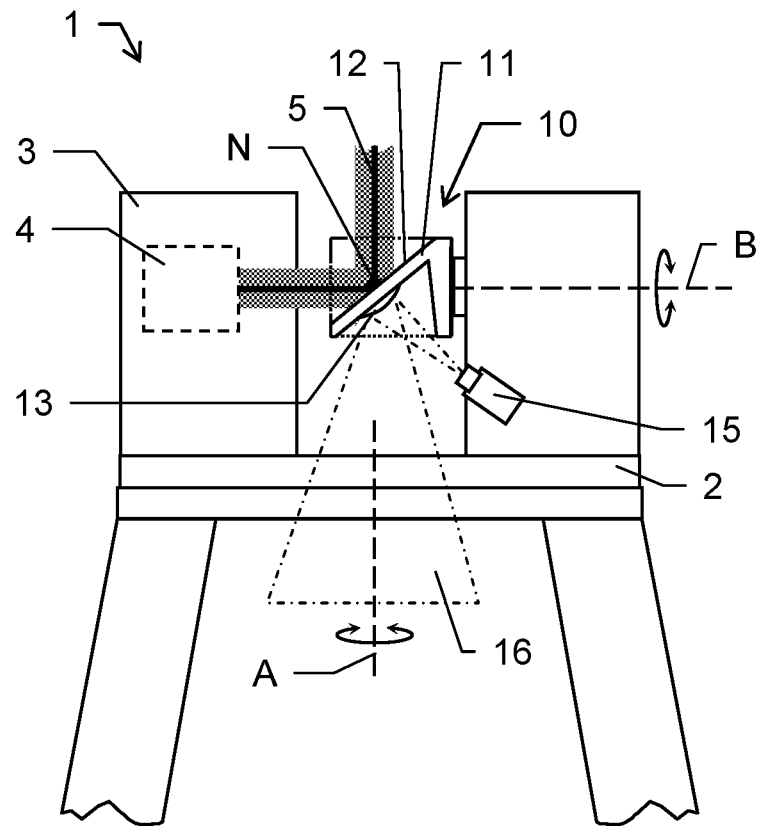

FIG. 1 shows a first embodiment of a laser scanner 1 according to the invention. The scanner 1 is shown here in a front-view perspective. The scanner 1 comprises a base 2 and a support unit 3 (scanner frame), wherein the base 2 defines a base axis A and the support unit 3 is arranged onto the base 2 and mounted rotatable around the base axis A. A rotational state of the support unit 3 relative to the base 2 is determinable by means of an angle encoder.

The support structure 3 defines and provides a fast scanning axis B which is aligned basically orthogonal to the base axis A. A rotation unit 10 is provided with the laser scanner 1 and arranged at the support structure 3 and mounted rotatable around the scanning axis B. The rotation unit 10 comprises a rotation body 11 with a scanning surface onto which a scanning mirror 12 is arranged tilted relative to the scanning axis B. In addition, the rotation body 11 or an axis by means of which the rotation body 11 is held and rotated is coupled to an encoding unit which provides (continuous) determination of an angle of rotation of the rotation body 11 around the scanning axis B, i.e. relative to the support unit 3. By that an elevation angle of the rotation body 11 can be determined.

Furthermore, the scanner 1 comprises a distance measuring unit 4 which provides emission of measuring light 5 and detection of reflected measuring light 5 so that a distance to an object at which the measuring light is reflected can be determined. The distance measuring unit 4 preferably comprises a light emitting unit like a laser diode and a photo-sensitive detector for detecting backscattered light. Both, emitting measuring light and receiving measuring light are deflected by means of the scanning mirror 12 and guided to an object to be measured or to the distance measuring unit 4 respectively. It is to be understood that determination of such distances can be realised by several methods well known to one of ordinary skill in the art, e.g. distances may be determined by use of the time-of-flight principle.

As can be seen from the combination of the rotatable elements and the distance measuring unit 4, the laser scanner 1 is designed for scanning a scene or scanning region as the rotation body 11 for redirecting a measuring beam (which is sent to an object as a transmission beam and the reflection of which is received as reception beam by the distance measuring unit 4) is rotating around the horizontal scanning axis B, and as a body 3 of the laser scanner 1 is rotating around the vertical base axis A. By sending out and receiving measuring light (e.g. laser signals) at respective positions of the components rotating around said axes A and B, thereby applying EDM (electronic distance measurement) techniques known from prior art, such as travel time measurement, the laser scanner 1 is enabled to "sense" the surface of a scene or object and to store the scanned points characterised by their three-dimensional coordinates. The distances detected are assigned to angle coordinates which are provided by mentioned encoders (angle sensors) arranged around the vertical axis and the horizontal axis. During the scan, a three-dimensional point cloud can be generated, out of which a CAD (computer aided design) model may be created. Such CAD model may be regenerated with means of a surface recognition algorithm so that the CAD file is simplified by having unnecessary points reduced. Said CAD model generating may take place on a computer or process unit inside the laser scanner, or e.g. on an external computer or cloud computer by using the "raw data", i.e. the point cloud.

The laser scanner 1 further comprises an imaging unit 15 for capturing image information related to a scanned object. The imaging unit 15 comprises a camera sensor and specific optics to image (and project) received light onto the senor in adjusted manner.

Correspondingly, the rotation body 11 comprises a curved deflecting element 13. The element may be provided by a hyperbolic mirror at the rotation body 11.

The imaging unit 15 is arranged fixedly with the support structure 3 and thus defines an optical axis with defined position and orientation relative to the scanner frame 3.

As can be seen, the imaging unit 15 here is fixedly arranged on the same side of the support structure 3 as the rotator (and driving unit for rotating the rotator) is arranged at. Of course, depending on the design of the optical arrangement, the camera can alternatively be arranged on the opposite side.

The imaging unit 15 and the curved deflecting element 13 are designed so and arranged relative to each other so that—in a predetermined orientation of the rotation body 11 relative to the support structure 3 (as shown in FIG. 1)—the imaging unit 15 corresponds with the deflecting surface 13 in desired manner. This means that the field of view of camera 15 (exemplarily) is deflected by the deflecting element 13 and thus defined in a manner to provide a field of view 16 having a comparatively great field angle in rotation direction of the rotation body 11 (rotation around the rotation axis B; elevation angle) and a smaller but also enlarged field angle in azimuthal direction.

According to the invention, by that arrangement a parallax-free setup is provided, i.e. by the relative arrangement of the imaging unit 15 and the curved deflecting element 13 and a particular surfaces, shape and dimension of the curved deflecting element 13.

The hyperbolic mirror 13 defines two particular focal points and is arranged with the rotation body so that one of the foci coincidences with the nodal point N of the laser canner. The nodal point is the intersection of the vertical (base) axis and the horizontal (rotation) axis. The nodal point N may also be defined by an intersection of the measuring light—or more particular of an optical axis defined by the measuring light—with the scanning mirror 12 (in particular, this point is coincident with the intersection of the A-Axis and the B-Axis). Furthermore, the hyperbolic mirror 13 is arranged with its other focal point coincidencing with the entrance pupil of the imaging unit 15—as least in case the rotation body is set into its predefined imaging alignment as shown. A respective distance between rotation body 11 and imaging unit 15 is chosen. This setup provides parallax-free acquisition of image data.

That provides capturing images with the camera 15 as if the centre of projection (entrance pupil of the camera) for image capturing is identical with the nodal point N for scanning.

A main advantage of such design is that image data is generated with a reference point which corresponds to the reference point of the scanning data. Therefore, data or coordinate transformations can be avoided or at least be reduced. A correction of parallaxes is also not required or at least greatly simplified because any significant imaging-scanning-parallax is initially avoided by the specific structural design of the system. Moreover, the camera is enabled to capture the same areas and points which can be measured by the scanner, i.e. there do not exist any occlusions of points, which could be scanned but could not be imaged.

Figure 2:
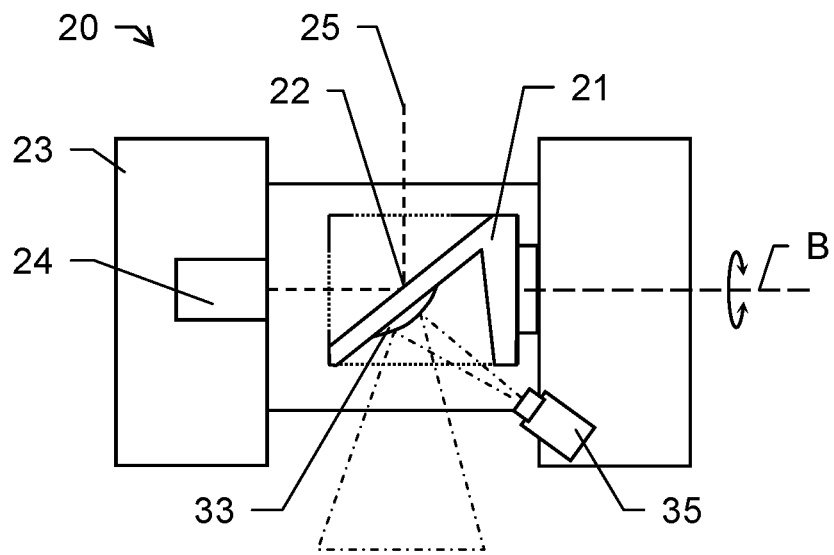
FIG. 2 shows a top-view of an embodiment of a laser scanner according to the invention.

FIG. 2 shows a further embodiment of a surveying instrument 20 according to the invention in a top-view perspective. The surveying instrument 20 comprises a distance measuring unit 24 which is arranges in the support structure 23 of the instrument 20. Measuring light 25 is reflected by a scanning mirror 22 at the rotation body 21. The scanning mirror 22 is a parabolic mirror.

The rotation body 21 also comprises a curved deflecting element 33 of hyperbolic shape. The curved deflecting element 33 is arranged on a side of the rotation body 21 opposite to the scanning mirror 22 and with one of its focal points corresponding to the nodal point of the setup.

The imaging unit 35, e.g. a camera, is arranged with lateral displacement relative to the rotation body 21. The rotation body 21 is shown in a predetermined and well defined imaging alignment so that light which impinges on the mirror 33 is guided into the imaging unit 35 in respectively defined manner.

For that, the imaging unit 35 comprises an optical assembly which provides imaging of incoming light on respective camera sensors of the imaging unit 25. As the curved deflecting element 33 is a hyperbolic mirror, the optical assembly is of specific design so that aberrations caused by the hyperbolic mirror 33 are compensated.

The imaging unit 35 comprises three camera sensors. The optical assembly is respectively designed for imaging particular zones of the hyperbolic mirror 33 on the respective camera sensors so that a common and continued field of view can be imaged and captured by the camera sensors.

Figure 3:
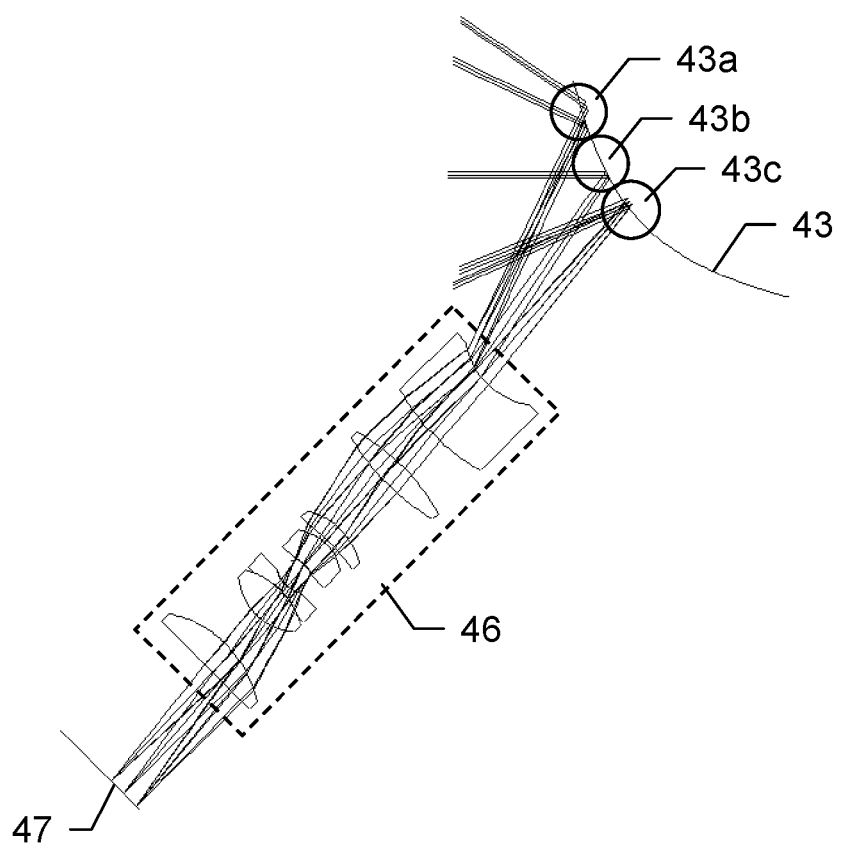
FIG. 3 shows a laser scanner according to the invention in side-view.

FIG. 3 depicts an embodiment of an optical assembly 46 designed for use with a hyperbolic mirror 43 (curved deflecting element) of a surveying system according to the invention and a camera sensor 47 on side of the imaging unit.

The optical assembly 46 comprises seven optical elements, e.g. several types of lenses, which are linearly and successively arranged in defined manner. Such design of an optical assembly 46 may for instance be derived by use of a computer model.

The optical assembly 46 provides imaging of particular parts of a field of view on defined locations of the assigned (to that particular field of view) camera sensor 47 by deflections at particular regions 43a-43c at the hyperbolic mirror 43. The camera sensor 47 may be positioned at a respective imaging plane. Each of the field-of-view-regions is imaged on particular regions of the sensor 47. As a result, the entire field of view can be imaged with the sensor 47.

Figure 4A:
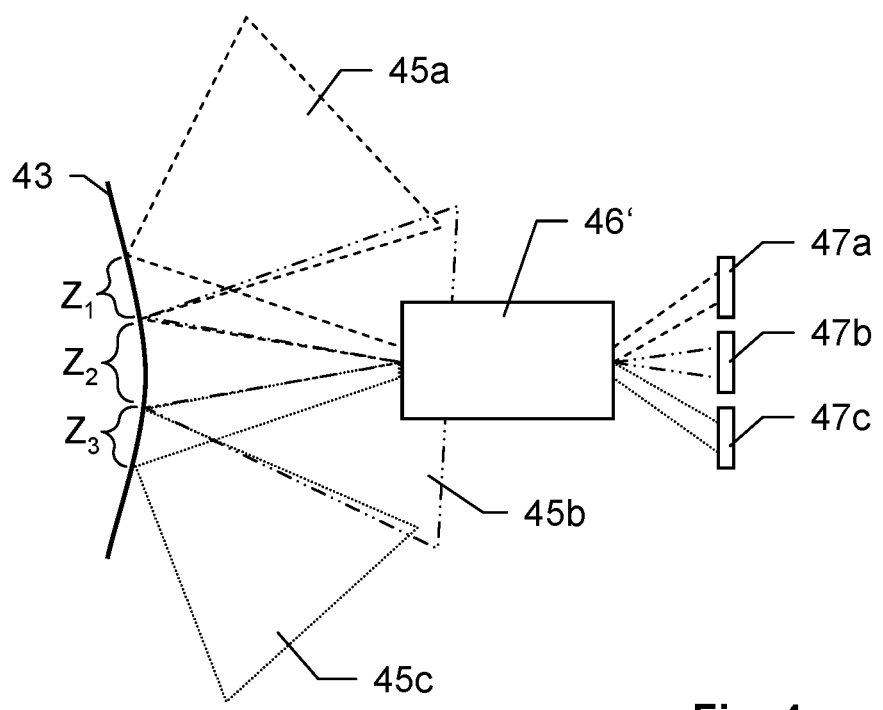
FIGS. 4a-b show an embodiment of an imaging system according to the invention.
Figure 4B:
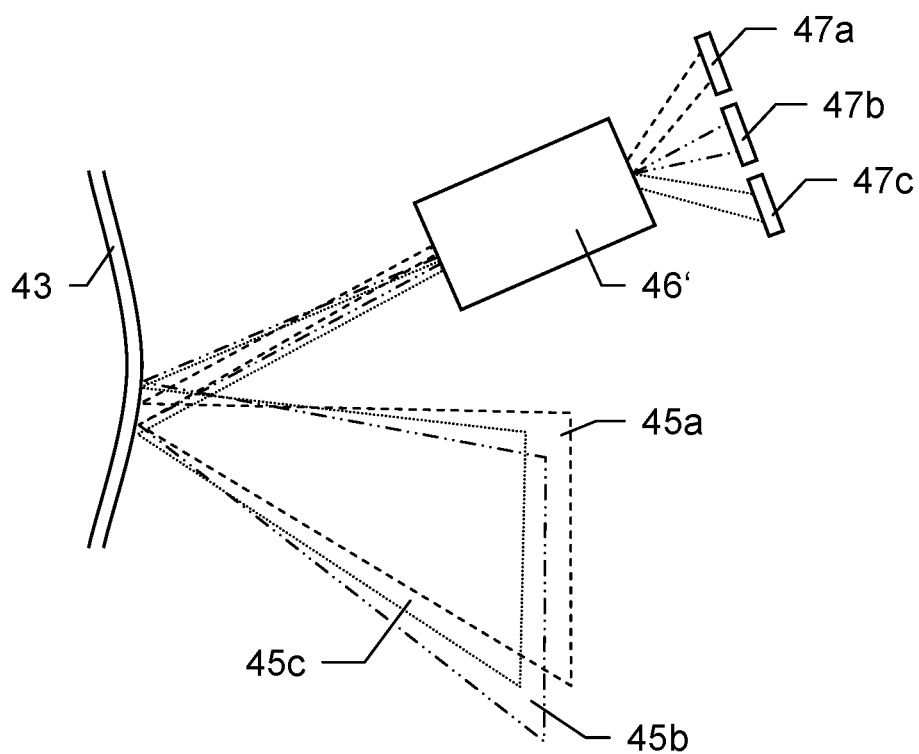

Moreover, such or an alternative optical assembly can provide imaging not only of one field of view onto one sensor but can also provide imaging of more than one fields 45a-c of view (e.g. two or three) on a respective number of camera sensors 47a-c, as shown with FIGS. 4a and 4b.

FIG. 4a shows an embodiment of an imaging system according to the invention in a side-view. The optical assembly 46' is combined with three camera sensors 47a-c and provides imaging of different fields of view on the sensors 47a-c. The fields of view 45a-c are defined by a deflection at the hyperbolic mirror 43. This means that there are particular zones $Z_1$-$Z_3$ at the mirror, wherein each of which is imaged on a particularly assigned sensor 47a-c by means of the optical assembly 46'. The zones $Z_1$-$Z_3$ (mirror 43) and the assembly 46' are arranged so that a large and combined field of view can entirely be captured by the sensors 47a-c. In other words, the optical assembly 46' adapted to the hyperbolic mirror 43 images three FOV zones $Z_1$-$Z_3$ (fields of view zones) to three camera sensors. By such combination of fields of view a significantly enlarged elevative range can be captured with "one shot". Of course, it is to be understood that the resulting number of zones and camera sensors can vary and would typically depend on the desired field of use. In addition the elevation angle of each field of view may vary as well.

FIG. 4b shows the embodiment of the imaging system in a top-view. The shown elements correspond to those of FIG. 4a. FIG. 4b depicts the design of the fields of view 45a-c with respect to the azimuthal direction. By azimuthal overlapping of the fields of view 45a-c, imaging of the entire and enlarged field of view provides image information over a common azimuthal range and simultaneously over the entire elevative range.

The camera sensors 47a-c may be positioned at respective imaging points. Of course, alternative embodiments may furthermore comprise additional deflection elements like mirrors for optimised positioning of the sensors within the imaging unit.

As a result of such arrangement of hyperbolic mirror 43, optical assembly 46' and camera sensors imaging of a significantly enlarged and continued field of view is provided. The resulting field of view is composed by three sub-fields each of which is defined and covered by one of the camera sensors. In other words and more specific, such arrangement allows acquiring image data over an elevation field angle of at least 120° and an azimuth field angle of at least 25° with "one shot". Image data can be generated by each of the camera sensors and the data can be combined to one set of image data which represents the mentioned field of view.

Figure 5:
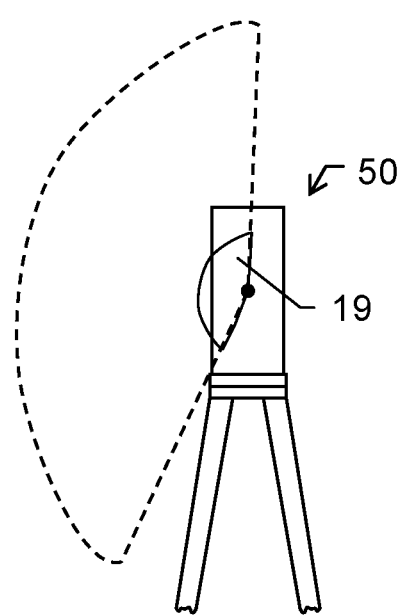
FIG. 5 shows a further embodiment of a rotation body of a surveying device according to the invention.

The elevation field angle 19 may in particular cover at least 140° depending on the design of the imaging unit. For instance there may be used a non-symmetric arrangement of the camera sensors, wherein at least one of the sensors is rotated (larger field angles relative to optical axis of the optical assembly 46). An embodiment of the surveying device 50 according to the invention, which defines such an enlarged field angle 19 is shown with FIG. 5 in a side-view perspective.

By rotating and holding the rotation body 11 in the predetermined imaging orientation relative to the fixed cameras and swivelling the support structure 3 around the base axis A while continuously or stepwise taking pictures with the camera sensors, a quasi full dome image of a surrounding of the laser scanner 1 can be captured by one 360° rotation of the support structure 3 in a certain number of steps. The step size can be reduced until a continuous movement results. More particular, a panoramic image which at least covers those areas which are also accessible by the measuring light 5 of the laser scanner can be generated that way. This is a result of a (quasi) parallax-free arrangement of the entrance pupil of the imaging unit with respect to the nodal point of the laser scanner 1 by use of the curved deflecting surface (in particular hyperbolic mirror).

Acquiring the full dome image may require e.g. 13 different azimuth positions, wherein image data is generated in each of those positions. Depending on the provided azimuth field of view less than 13 different azimuth positions can be sufficient.

Figure 6:
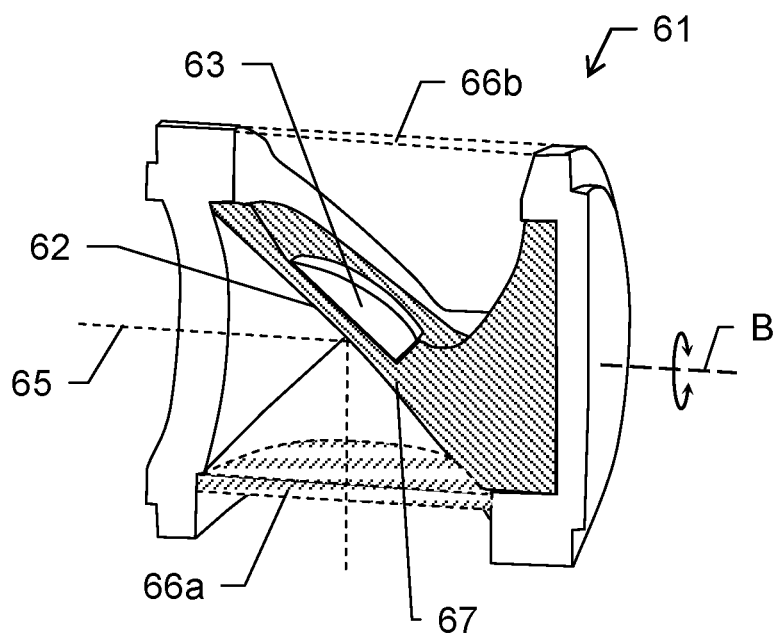
FIG. 6 shows an embodiment of an optical assembly of an imaging unit of a laser scanner according to the invention.
Figure 7:
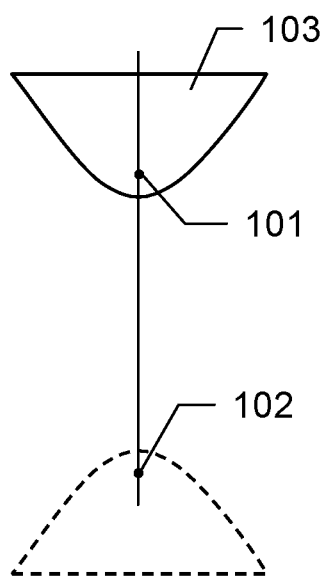
FIG. 7 shows the principle of hyperbolic geometry as applied with an embodiment of the invention.

FIG. 6 shows an embodiment of a rotation body 61 (rotor) of a rotation unit for a laser scanner according to the invention. Not shown is a driving unit and other components of the rotation unit which provide a rotational movement of the rotator 61 in use with a laser scanner.

The rotator 61 comprises a scanning mirror 62 which provides deflection of a measuring laser light 65 for distance measuring purpose. The scanning mirror 62 can be a planar or curved, e.g. parabolic, mirror. The measuring laser light 65 is guided through a first rotator window 66a, which comprises optimized transparency with respect to a wavelength of the measuring laser light 65. An axis of rotation B is defined by the shape and dimensions of the rotation body 61.

The rotation body 61 further comprises a curved deflecting element 63 which is arranged on an opposite side of a holder 67 which also provides the scanning mirror 62. The curved deflecting element 63 may be embodied as on piece with the holder 67, i.e. with the rotation body 61. In other words, the deflecting surface can be formed, in particular milled and/or polished, as one part with the rotation body (holder 67). Hence, the mirrors 62,63 can be milled or turned into a monolithic rotor 61.

Alternatively, at least one of the reflecting mirrors 62,63 can be provided as a separate mirror element attached, in particular glued or mechanically clamped (e.g. by use of a screw), to the rotation body 61.

The curved deflecting element 63 is designed and arranged in order to provide acquisition of image data, in particular RGB colour information for each scanning point of a scanning point cloud, in parallax-free manner. The curved deflecting element 63 deflects an optical axis and a correlated field of view of a camera or of a camera sensor (assigned by the laser scanner) for provision of an enlarged field of view in order to optimize acquisition of image data with reduced acquisition time. The rotator 61 can be hold in one rotation position and is turned around a base axis only.

The curved deflecting element 63 can comprise an elliptical, parabolic or hyperbolic surface shape.

The rotor 61 comprises a second window 66b which on the one hand protects the curved deflecting element 63 from contamination and on the other hand provides increased stability of the rotation body 61. Mentioned protection and stability issues also apply to the first window 66a.

It is to be understood, that the present invention also relates to an embodiment, where the rotor 61 only comprises the two mirror elements 62,63 without having further window or protection components.

Although the invention is illustrated above, partly with reference to some specific embodiments, it must be understood that numerous modifications and combinations of different features of the embodiments can be made and that the different features can be combined with each other or with laser scanners known from prior art.

What is claimed is:

1. A surveying device comprising:
   a base which defines a base axis (A);
   a support structure rotatable around the base axis (A) and which defines a rotation axis (B) which is oriented basically orthogonal relative to the base axis (A);
   a light emitting unit for emitting measuring light;
   a light receiving unit comprising a detector for detecting reflected measuring light;
   a rotation unit mounted on the support structure for providing emission and reception of the reflected measuring light in defined directions, wherein the rotation unit comprises a rotation body which is mounted rotatable around the rotation axis (B) and the rotation body comprises:
      at least one slanted scanning surface which includes a scanning mirror arranged tilted relative to the rotation axis (B) and provides defined deflection of the measuring light, and
      a curved deflecting element different from the scanning surface,
   an imaging unit including at least one camera sensor for capturing image data of a scanning region and is fixedly arranged with respect to the support structure such that an optical axis of the camera sensor is directed towards the rotation body; and
   a controlling and processing unit,
   wherein the imaging unit and the rotation body are designed and arranged relative to each other so that only in a predetermined imaging-alignment of the rotation body around the rotation axis (B):
      the optical axis of the at least one camera sensor is deflected by the curved deflecting element by a predetermined angle and direction,
      a field of view of the at least one camera sensor is deflected and defined by the deflection of the optical axis so that the field of view comprises a defined field angle around the rotation axis (B),
   wherein the curved deflecting element defines a first and a second geometric focal point, and the curved deflecting element is arranged so that:
      the first focal point positionally coincides with an intersection point of the base axis (A) and the rotation axis (B), and
      the second focal point at least basically positionally coincides with an entrance pupil for the at least one camera sensor in the imaging-alignment of the rotation body.

2. The surveying device according to claim 1, wherein the curved deflecting element:

comprises an elliptical, parabolic, hyperbolic shape, or is embodied as a hyperboloid having a reflective surface.

3. The surveying device according to claim 1, wherein:
the imaging unit comprises at least two camera sensors, wherein the imaging unit is fixedly arranged with the support structure so that the optical axes of the at least two camera sensors are directed towards the rotation body,
the imaging unit and the rotation body are designed and arranged relative to each other so that in the predetermined imaging-alignment of the rotation body around the rotation axis (B):
the optical axes of the at least two camera sensors are deflected by the curved deflecting element by respectively desired angles and directions, and
sub-fields of view of the at least two camera sensors are deflected and defined by the deflection of the optical axes so that one combined and continued wide-angle elevation field of view around the rotation axis (B).

4. The surveying device according to claim 3, wherein the continued wide-angle elevation field of view covers
an angle of at least 100° around the rotation axis (B), or
an angle of at least 25° around the base axis (A).

5. The surveying device according to claim 3, wherein each of the sub-fields of view which is defined by a deflection by means of the curved deflecting element in the predetermined imaging-alignment partly covers the wide-angle elevation field of view, wherein an overlap of adjacent elevation sub-fields of view is provided.

6. The surveying device according to claim 1, wherein the imaging unit comprises an optical assembly which images a field of view zone which is provided by the curved deflecting element to the at least one camera sensor.

7. The surveying device according to claim 6, wherein the optical assembly provides compensated imaging of light which is deflected by the curved deflecting element on the at least one camera sensor.

8. The surveying device according to claim 6, wherein the optical assembly provides compensation of a refractive effect or an asymmetric aberration resulting from a curved design of the curved deflecting element.

9. The surveying device according to claim 6, wherein the optical assembly comprises a set of at least five successively arranged optical elements, the at least five optical elements represent a result of a calculation which is based on a design model which considers a design of the curved deflecting element.

10. The surveying device according to claim 1, wherein:
the controlling and processing unit provides an imaging functionality which is configured so that the image data is recordable with each of the at least one camera sensors when the rotation body is in the predetermined imaging-alignment, or
the controlling and processing unit is configured to control a step of rotating the rotation body around the rotation axis (B) so that the rotation body is brought in the predetermined imaging-alignment.

11. The surveying device according to claim 1, wherein the rotation body is configured so that the scanning mirror is arranged on a front side of the rotation body and the curved deflecting element is arranged on the backside of the rotation body, or
the rotation body is a arranged in a cylindrical cover which is designed to provide at least a first transmission window for emission and reception of the measuring light and a second transmission window for reception of light for capturing image data by the at least one camera sensor.

12. The surveying device according to claim 1, wherein the predetermined imaging-alignment is provided:
by one range of rotation around the rotation axis (B), or
by one angle of rotation around the rotation axis (B).

13. A rotation body of a rotation unit for a surveying device, the rotation body being adapted to be mounted on the surveying device for providing defined emission and reception of measuring light by rotation around a rotation axis (B), the rotation axis (B) being defined by a design of the rotation body, wherein the rotation body comprises:
at least one slanted scanning surface which comprises a scanning mirror which is arranged tilted relative to the rotation axis (B) and provides defined deflection of the measuring light;
a curved deflecting element different from the scanning surface and providing, when mounted on the surveying device, defined deflection of an optical axis of a camera sensor of the surveying device and an enlargement of a field of view of the camera sensor, wherein the curved deflecting element defines a first and second geometric focal point.

14. A method of generating quasi full-dome image data of a scanning region by use of a surveying device in controlled and automatic manner, the method comprising:
setting up a surveying device at a defined position, the surveying device including:
a base which defines a base axis (A);
a support structure rotatable around the base axis (A) and which defines a rotation axis (B) which is oriented basically orthogonal relative to the base axis (A);
a light emitting unit for emitting measuring light;
a light receiving unit comprising a detector for detecting reflected measuring light;
a rotation unit mounted on the support structure for providing emission and reception of the reflected homeasuring light in defined directions, wherein the rotation unit comprises a rotation body which is mounted rotatable around the rotation axis (B) and the rotation body comprises:
at least one slanted scanning surface which includes a scanning mirror arranged tilted relative to the rotation axis (B) and provides defined deflection of the measuring light, and
a curved deflecting element different from the scanning surface,
an imaging unit including at least one camera sensor for capturing image data of a scanning region and is fixedly arranged with respect to the support structure such that an optical axis of the camera sensor is directed towards the rotation body; and
a controlling and processing unit;
moving the rotation body into a predetermined imaging-alignment;
capturing a first set of image data by means of the at least one camera sensor;
automatically re-orienting the support structure around the base axis (A) by a defined angle according to a provided azimuth field of view of the at least one camera sensor, wherein the rotation body is held in the predetermined imaging-alignment;
automatically capturing a further set of image data by means of the at least one camera sensor; and repeating the steps of re-orienting the support structure and of capturing a further set of image data until the scanning region is covered over an azimuth angle of at least 360°, wherein the imaging unit and the rotation body are designed and arranged relative to each other so that only in the predetermined imaging-alignment of the rotation body around the rotation axis (B):

the optical axis of the at least one camera sensor is deflected by the curved deflecting element by a predetermined angle and direction, and a field of view of the at least one camera sensor is deflected and defined by the deflection of the optical axis so that the field of view comprises a defined field angle around the rotation axis (B).

* * * * *